Patented Nov. 25, 1952

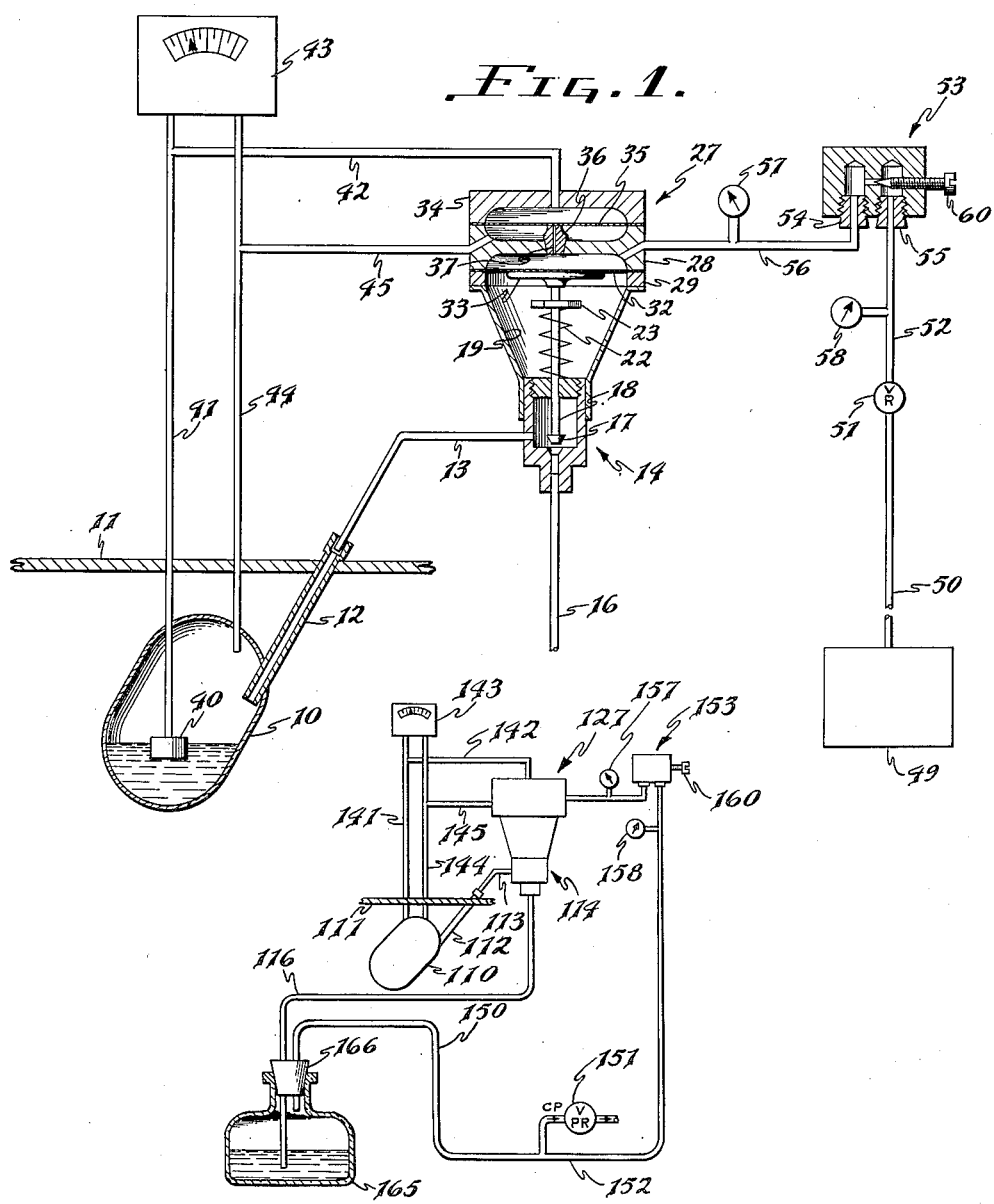

2,619,107

UNITED STATES PATENT OFFICE 2,619,107

FLUID FLOW CONTROL SYSTEM

Clifton B. Graham, Oak Ridge, Tenn., assignor, by mesne assignments, to the United States of America as represented by the United States Atomic Energy Commission Application March 30, 1945, Serial No. 585,764

4 Claims. (Cl. 137—393)

This invention relates to a fluid flow control system particularly for controlling the flow of a vaporizable liquid medium used for freezing out moisture in vacuum systems.

The invention has particular application in connection with maintenance of vacuum in isotope separating apparatus, for instance, in the electromagnetic type. In such apparatus an evacuated system is employed and commonly traps filled with liquid nitrogen are employed for freezing out moisture from the system.

An object of my invention is to provide a control system for automatically controlling the supply of medium, particularly when it is liquid nitrogen, to traps to eliminate the need for manual filling of and attention to the traps. The number of maintenance personnel is thereby reduced and manual trap filling equipment is unnecessary. The level in the traps may then also be maintained more uniformly at the desired level.

Another object is to provide a control system for controlling a flow of cold medium such as liquid nitrogen, responsively to the liquid level thereof in a container such as a trap.

Another object is to provide a control system for a supply of cold medium such as liquid nitrogen to a trap wherein the supply is controlled in response to a pressure determined by the level of liquid in the trap.

Another object is to provide a system of the type referred to in the previous object wherein the flow is controlled by a pressure responsive device and the motive power for actuating the device is supplied by the pressure of the vapor of the medium being controlled.

Further objects and numerous advantages of my invention will become apparent from the following detailed description and annexed drawing wherein Fig. 1 is a diagrammatic representation of a flow control system for liquid nitrogen having my invention embodied therein and having elements of the system shown in cross section.

Fig. 2 is a diagrammatic representation of a modified form of my invention.

Referring to Fig. 1 of the drawing, numeral 10 designates a trap such as for liquid nitrogen supported within an evacuated chamber having a sidewall 11. The trap has a filler pipe 12 and extending into the filler pipe is a pipe or tube 13 connected to the outlet of a control valve 14. The valve 14 has a supply pipe 16 from any suitable supply of liquid nitrogen connected to the inlet thereof. The valve 14 has a valve member 17 on a stem 18 extending upwardly into a housing 19 attached to the upper part of the valve and surrounding the stem is a coil spring 22 which bears against a disc 23 on the stem 18 so as to normally bias the valve in opening direction.

Numeral 27 designates a pressure responsive relay mechanism attached to housing 19. It comprises a circular member 28 the upper and lower sides of which are dished out as shown and the lower part of member 28 fits against a ring member 29 with the edges of a flexible diaphragm 32 interposed and sealed between members 28 and 29. Member 29 is sealed to a flange at the upper part of housing 19. Thus a pressure chamber is formed above and below diaphragm 32. Numeral 33 designates a disc on the end of stem 18 which bears against diaphragm 32.

Numeral 34 designates another circular member the lower side of which is dished out as shown and the lower part of which fits against the upper part of member 28 with the edges of a flexible diaphragm 35 sealed therebetween. A pressure chamber is thus formed above and below diaphragm 35.

The central portion of member 28 forms a septum between the pressure chamber above diaphragm 32 and that below diaphragm 35. Fitted in the center of this septum is an orifice plug or nozzle 36 having an orifice 37; the upper end of nozzle 36 is flat and it bears against diaphragm 35 so that depending on the position of diaphragm 35 pressure may be allowed to bleed through orifice 37 from the chamber above diaphragm 32 into that below diaphragm 35.

Numeral 40 designates a bell chamber partly immersed in the liquid trap 10 and it is connected by tubes 41 and 42 to a differential pressure indicator 43 and to the chamber above diaphragm 35. The space above the liquid level in trap 10 is connected by tubes 44 and 45 to the pressure indicator 43 and the chamber below diaphragm 35.

Numeral 50 designates a pipe or tube connected to any suitable regulated source of compressed air 49 which is passed through a reducing valve 51 where its pressure is reduced to approximately a steady 15 lb. per sq. in. The outlet of valve 51 is connected by tube or pipe 52 to a needle valve device 53. The device 53 has two tapped holes or openings as shown in which are fitted orifice plugs 54 and 55; pipe 52 connects to plug 55 and plug 54 connects to the chamber above diaphragm 32 by pipe 56. Numerals 57 and 58 designate pressure gauges. There is a horizontal channel or orifices between the tapped holes in device 53 and the tapered end of an adjustable screw 60 fits therein forming a needle valve. From the foregoing it will be observed that pressure can flow from pipe 50 through valve 51, pipe 52, and then bleed through device 53 and pipe 56 into the chamber above diaphragm 32 and thence through the orifice 37 in plug 36 into the chamber below diaphragm 35 if the diaphragm is not tight against the end of the plug. Pressure from the chamber below diaphragm 35 can bleed through pipes 45 and 44 into trap 10 and thence to atmosphere through filler pipe 12, pipe 13 not fitting tightly therein.

In the operation of the system, when valve 14 is open, liquid nitrogen under pressure flows through pipes 16, 13, and 12 into the trap 10. As the level therein rises vapor of the liquid is trapped in bell chamber 40 and pipes 41 and 42 so that a pressure is developed in the chamber above diaphragm 35 which is dependent on the liquid level in trap 10. When the liquid level is at a predetermined height in trap 10 the pressure above diaphragm 35 will be sufficient to hold it tightly against plug 36 so that air cannot bleed out of the chamber above diaphragm 32 as described above. Air will continue to bleed through device 53 until the pressure in pipe 56 and above diaphragm 32 equals the 15 lb. per sq. in. supplied to device 53. As the pressure builds up above diaphragm 32 it will be urged downwardly pushing disc 33 and stem 18 downwardly against the force of spring 22 and seating the valve member 17 to thus close the valve and cut off the supply of liquid nitrogen.

When the liquid level in trap 10 falls due to vaporization therewithin the pressure in pipes 41 and 42 and above diaphragm 35 will fall allowing the diaphragm 35 to move away from plug 36 and thus allowing air to bleed out of the chamber above diaphragm 32. This air bleeds into trap 10 through pipes 45 and 44 as described above. Release of pressure from above diaphragm 32 allows spring 22 to move disc 33 and stem 18 upwardly so as to open valve 14 allowing liquid nitrogen to flow to the trap 10. The arrangement thus functions to maintain a constant level of liquid in trap 10. The pressure below diaphragm 35 and in pipes 45 and 44 is substantially atmospheric and the differential between this pressure and that in pipes 41 and 42 may be read at any time on indicator 43.

Referring to Fig. 2, a modified form of the invention is represented wherein vapor of the nitrogen is used to actuate the control valve mechanism. The system is otherwise the same and corresponding parts are numbered correspondingly with numerals one hundred greater. Numeral 165 designates a supply container or bottle of liquid nitrogen having a plug or stopper 166 through which extends the liquid supply pipe 116 and a vapor pipe 150.

Numeral 151 designates a pressure relief valve, that is, a regulating valve of known type which releases vapor from pipe 150 so as to maintain a constant vapor pressure of 15 lbs. per sq. in. in pipes 150 and 152. Device 153 is the same as device 53 of Fig. 1 and the other parts of the system are the same, and the operation is the same except that the vaporized nitrogen is used as the source of motive power for actuating the flow controlling element.

From the foregoing those skilled in the art will observe that I have provided an efficient control arrangement for continuously maintaining traps or similar devices filled to the desired level with cooling medium or other agent; manual operations and manual handling equipment are eliminated thus reducing maintenance costs proportionately.

The embodiment of my invention disclosed herein is representative of its preferred form. The disclosure is to be interpreted in an illustrative rather than a limiting sense, the scope of the invention being determined in accordance with the claims appended hereto.

I claim:

1. In a control system, in combination, means forming a vessel containing a quantity of liquid nitrogen, automatic control means for controlling a supply of liquid nitrogen to the vessel, said control means comprising a device responsive to the level of liquid in the vessel, said device including a bell chamber extending into the liquid in the vessel for trapping vaporized nitrogen therein and pressure actuating means actuatable in response to the differential between the pressure in the bell chamber and the pressure in the vessel exterior to the bell chamber.

2. In a control system, in combination, means forming a vessel containing a quantity of vaporizable liquid medium, automatic control means for controlling a supply of said medium to said vessel, said automatic means comprising a pressure responsive valve, a bell chamber in the liquid in the vessel and means whereby the valve is actuated in accordance with the pressure of the vaporized medium trapped in said bell chamber.

3. In a control system, in combination, means forming a vessel containing a quantity of vaporizable liquid medium, automatic control means for controlling a supply of said medium to said vessel, said automatic control means comprising a pressure responsive control device embodying a flexible diaphragm having pressure chambers on opposite sides thereof, a bell chamber extending into the liquid in said vessel arranged to trap vapor of said medium therein, and means connecting the chamber on one side of the diaphragm to the interior of said bell chamber and the chamber on the other side of said diaphragm to the interior of said vessel whereby the diaphragm is positioned in accordance with the differential in pressure between the interior of the bell chamber and the interior of the vessel.

4. A control system for regulating the level of a liquid comprising a vessel for receiving a liquid, a valve for controlling the flow of the liquid to the vessel, said valve including a pair of spaced flexible diaphragms to define sets of pressure chambers, a wall separating adjacent pressure chambers of said sets, an orifice in said wall to provide communication between said adjacent pressure chambers, a valve element engaged by one of said diaphragms, a source of gas at a predetermined pressure for feeding one of said adjacent pressure chambers defined by said valve element engaging diaphragm, means for bleeding gas from the other of said adjacent chambers, and means responsive to the rise of liquid in said vessel for applying a pressure to one of said pressure chambers for displacing the other of said diaphragms to close said orifice and build up the pressure of said gas above said first named diaphragm whereby to actuate said valve element and interrupt the flow of said liquid into said vessel.

CLIFTON B. GRAHAM.

REFERENCES CITED

The following references are of record in the file of this patent:

UNITED STATES PATENTS

| Number | Name | Date |
| --- | --- | --- |
| 863,299 | Manning | Aug. 13, 1907 |
| 1,156,941 | Stevens | Oct. 19, 1915 |
| 1,936,049 | De Mers | Nov. 21, 1933 |
| 2,196,999 | Longhridge | Apr. 16, 1940 |
| 2,263,252 | Tallman | Nov. 18, 1941 |